United States Patent

Kawai et al.

[11] Patent Number: 5,988,518
[45] Date of Patent: Nov. 23, 1999

[54] AUTOMOTIVE AIR CONDITIONER

[75] Inventors: Takayoshi Kawai, Hoi-gun; Hiroshi Nonoyama, Toyota, both of Japan

[73] Assignee: Denso Corporation, Kariya, Japan

[21] Appl. No.: 09/162,883

[22] Filed: Sep. 29, 1998

[30] Foreign Application Priority Data

Oct. 13, 1997 [JP] Japan ................................. 9-278340
Jun. 24, 1998 [JP] Japan ................................. 10-177350

[51] Int. Cl.⁶ .............................................. B60H 1/00
[52] U.S. Cl. ........................ 236/49.3; 62/163; 165/202; 165/249
[58] Field of Search ........................ 236/13, 49.3, 94; 62/163, 161, 125, 126, 127, 129, 130, 131, 244; 454/69, 75, 229; 165/202, 203, 204, 42, 43, 248, 249

[56] References Cited

U.S. PATENT DOCUMENTS

| | | | |
|---|---|---|---|
| 4,951,476 | 8/1990 | Yamamoto et al. | 62/163 |
| 5,220,805 | 6/1993 | Fukudomi | 62/126 |
| 5,230,467 | 7/1993 | Kubsch et al. | 62/127 X |
| 5,590,540 | 1/1997 | Ikeda et al. | 454/75 X |
| 5,833,133 | 11/1998 | Dage | 236/13 |

*Primary Examiner*—Harry B. Tanner
*Attorney, Agent, or Firm*—Harness, Dickey & Pierce, PLC

[57] ABSTRACT

On an air-conditioning control panel equipped with an inside/outside air changeover switch which enables selection of an inside air recirculation mode, an outside air intake mode or an inside-outside two-air layer mode and comprises an inside air recirculation button and a light-emitting diode indicator, when the inside air recirculation button is turned on to light up the light-emitting diode indicator, the manual operation mode is selected for control of air-conditioning operation and the inside air recirculation mode is selected for air inlet operation. Further, when the inside air recirculation button is turned off to extinguish the light-emitting diode indicator, the automatic control mode is selected for control of air-conditioning operation and either the outside air intake mode or the inside-outside two-air-layer mode is selected for air inlet operation.

9 Claims, 11 Drawing Sheets

AUTOMOTIVE AIR CONDITIONER

CROSS REFERENCE TO RELATED APPLICATIONS

This application is based upon and claims priority from Japanese patent application Nos. Hei 9-278340, filed Oct. 13, 1997, and Hei 10-177350, filed Jun. 24, 1998, the entire contents of which are incorporated herein by reference.

BACKGROUND OF THE INVENTION

1. Field of the Invention

The present invention relates to an automotive air conditioner having an air-conditioning control panel including a changeover switch for switching between an automatic-control-mode air inlet switching function and a manual-operation-mode air inlet switching function, and a visual indicator arranged to be turned on when the changeover switch is pressed once and be turned off when it is pressed again.

2. Description of Related Art

One type of known automotive air conditioner has an inside/outside air (air inlet) mode switching function for choosing between an inside air recirculation mode and an outside air intake mode automatically (under automatic control), and has an auto switch (of pushbutton type) on an air-conditioning control panel for designating such automatic control. The air-conditioning control panel is also equipped with a manual switch (of pushbutton type) for allowing a passenger in an automobile to manually choose between the inside air recirculation mode and the outside air intake mode.

The manual switch has, for example, two light-emitting diode (LED) indicators. When the inside air recirculation mode is selected for air inlet operation manually (by pressing the manual switch), an inside air recirculation LED indicator is turned on. Then, when the manual switch is pressed again, an outside air intake LED indicator is turned on (the inside air recirculation LED indicator is turned off).

When the auto switch is turned on, the inside air recirculation mode is chosen automatically to increase cooling performance in cooling-down operation in summer. Then, when inside air in a passenger compartment is cooled down to a certain temperature level, the inside air recirculation mode is switched to the outside air intake mode automatically for the purpose of ventilation. In other words, under normal automatic control, the inside air recirculation mode is chosen when a cooling load is significantly large, and the outside air intake mode is selected when it is not.

In an arrangement that the auto switch and manual switch mentioned above are equipped on the air-conditioning control panel, however, there is a disadvantage that the number of parts mounted thereon increases. Furthermore, recent technological trends are toward a larger size of air-conditioning control panel for incorporating a diversity of automotive air-conditioning functions, resulting in a problem that it is difficult to mount instruments, cassette deck, radio set, and other passenger compartment equipment at convenient positions near passengers (driver in particular).

SUMMARY OF THE INVENTION

The present invention is made in light of the foregoing problems, and it is an object of the present invention to provide an automotive air conditioner which reduces the number of parts mounted on an air-conditioning control panel and reduces its size.

According to an aspect of the present invention, when a changeover switch mounted on the air-conditioning control panel is operated, a manual operation mode is chosen as a control mode, and an inside air recirculation mode is chosen as an air inlet mode. Thus, a single visual indicator indicates that the manual operation mode and the inside air recirculation mode have been selected. Then, by air inlet mode switching means, the inside air recirculation mode is chosen for the air inlet mode, so that only inside air in a passenger compartment is drawn into an air-conditioning casing through an inside air inlet.

When the changeover switch is operated again, an automatic control mode is chosen for control of air-conditioning mode, and an outside air intake mode or inside-outside air intake mode is chosen as the air inlet mode. Thus, the single visual indicator indicates that the automatic control mode and the outside or inside-outside air intake mode have been selected. Then, by the air inlet mode switching means, the outside or inside-outside air intake mode is chosen for air inlet operation so that air outside the passenger compartment is drawn into the air-conditioning case through an outside air inlet or air inside the passenger compartment and air outside it are drawn thereinto through the inside and outside air inlets.

In the abovementioned arrangement having the single visual indicator and the single changeover switch, it is possible to make air inlet selection under automatic control, and perform the switching between the manual operation mode and the automatic control mode.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

The present invention will now be described in detail by way of example with reference to the accompanying drawings.

In the inventors' examination regarding the present invention, the following arrangement has been tried for accomplishing the primary object thereof: A single changeover switch with a single visual indicator means is provided on an air-conditioning control panel so that an air inlet mode switching by an automatic control and an air inlet mode switching by a manual control(manual operation) are available. According to such arrangement, the control mode is switched to a manual operation mode, and the air inlet mode is switched to an inside air recirculation mode when the changeover switch is operated once. When the changeover switch is operated twice, the air inlet mode is switched to the automatic control.

In this arrangement, the air inlet mode switching by the manual operation is available for the following reason. For instance, when intrusion of contaminated outside air into the passenger compartment is found, a passenger in the passenger compartment can immediately switch the air inlet mode from an outside air intake mode to the inside air recirculation mode to prevent the intrusion of contaminated outside air into the passenger compartment.

Under condition that the air inlet mode is switched to the inside air recirculation mode, the single visual indicator means (e.g., LED) is turned on (or off). In this situation, if it is arranged so that the air inlet mode is switchable to the inside air recirculation mode automatically by automatic control, such as in cooling-down control in summer, the visual indicator means comes on even when the automatic control is selected. Therefore, the passenger in the passenger compartment cannot recognize whether the inside air recirculation mode has been selected manually or automatically.

It may possible to arrange that when the automatic control mode is selected, the visual indicator means is not turned on (visual indication is not given to the passenger in the passenger compartment) and the inside air recirculation mode is selected automatically. In such case, however, the passenger in the passenger compartment cannot select the outside air intake mode manually. Further, a condition that the inside air recirculation mode is set up while the visual indicator means indicates the outside air intake mode is considered to be a fatal defect in product design, causing the passenger in the passenger compartment to be put into confusion.

Therefore, the present invention is arranged in light of the foregoing problems so that the air inlet mode under the automatic control mode is prohibited to be switched to the inside air recirculation mode. More specifically, in the automatic control mode, the air inlet mode is switched to either one of the following two air intake modes; inside-outside two-air-layer intake mode(mixture mode) in which the mixed air of air inside the passenger compartment and air outside it are drawn into an air-conditioning casing, and outside air intake mode in which only air outside the passenger compartment is drawn thereinto.

[First Embodiment]

Referring to FIGS. 1 to 13, there is shown a first embodiment of the present invention.

An automotive air conditioner in the present preferred embodiment is structured so that each air-conditioning means (actuator) in an air-conditioning unit 1 for conditioning inside air in a passenger compartment of an automobile equipped with a diesel engine for example (hereinafter referred to just as an engine) is controlled by an air-conditioning control unit 50 (hereinafter referred to as an air conditioner ECU) to maintain an inside air temperature in the passenger compartment at a preset level under automatic control.

The air-conditioning unit 1, mounted on the automobile, has an air-conditioning case 2 which forms an air passage for introducing conditioned air into the passenger compartment. The air-conditioning case 2 is arranged to contain inside/outside air inlet switching means, a centrifugal blower, and air outlet switching means, respectively from the air upstream side.

Figure 1:
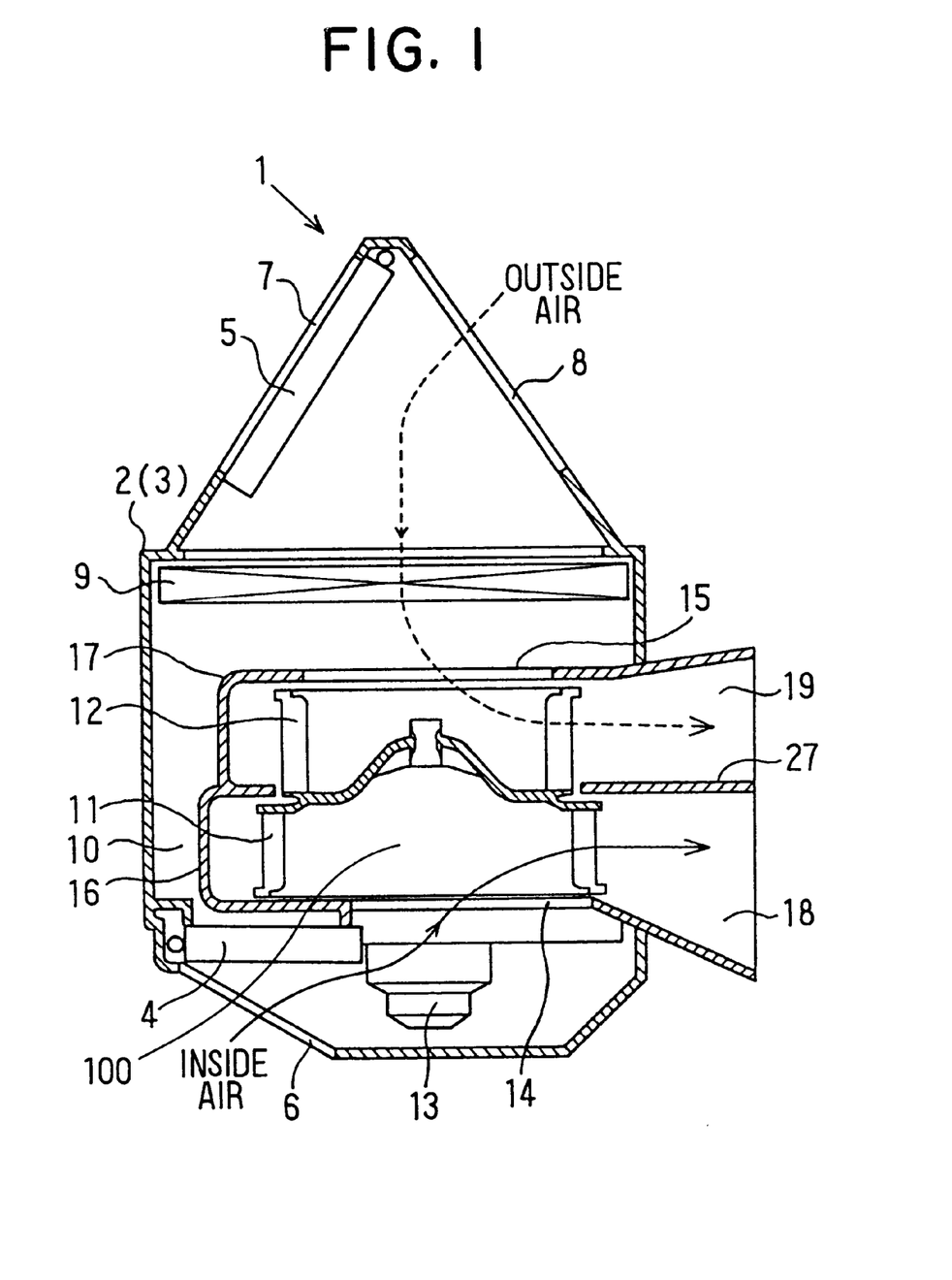
FIG. 1 is a cross sectional view showing a part of an air-conditioning unit under an inside-outside two-air-layer mode(mixture mode) according to a first embodiment of the present invention.
Figure 3:
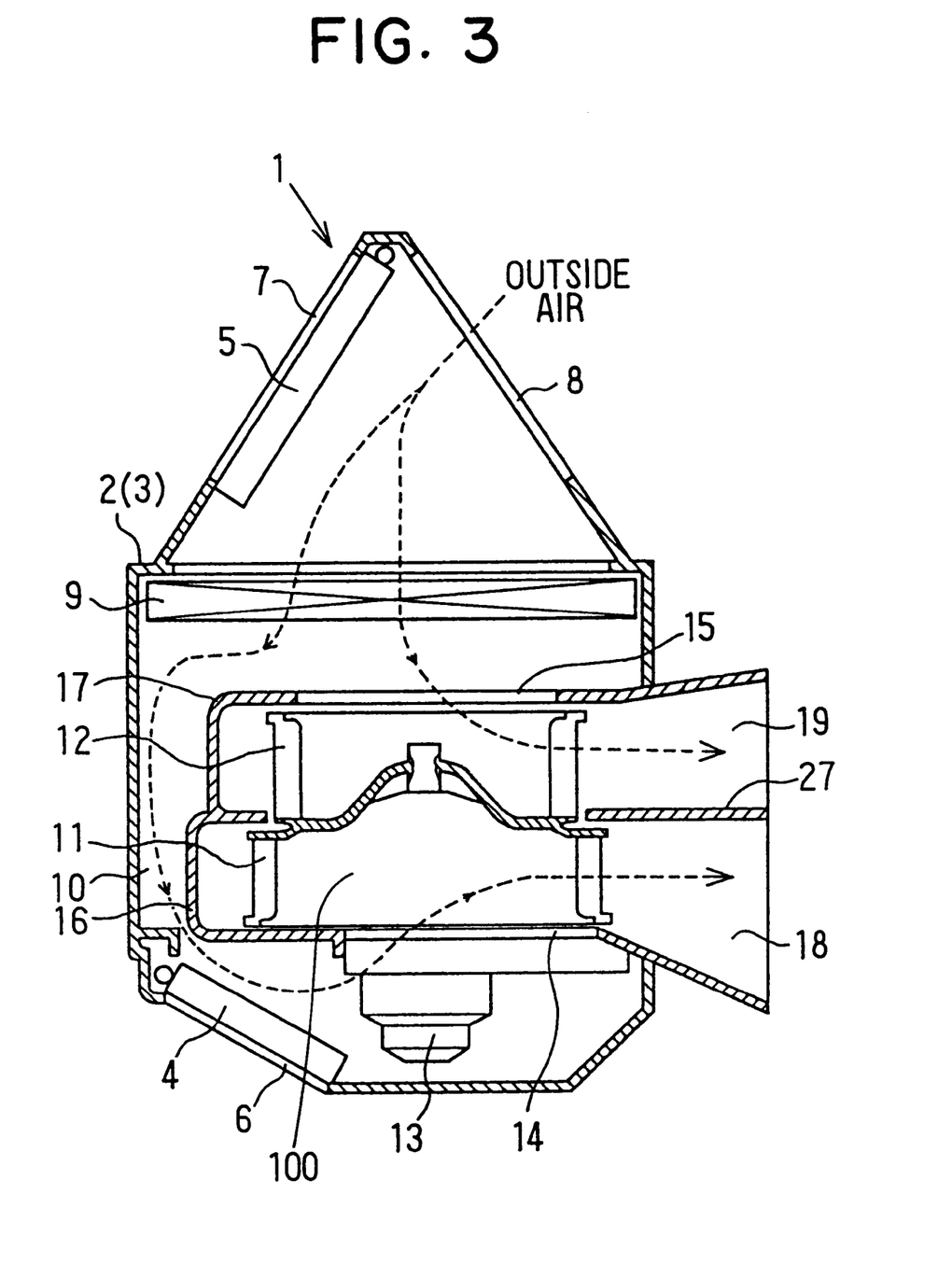
FIG. 3 is a cross sectional view showing a part of the air-conditioning unit under an outside air intake mode according to the first embodiment of the present invention.

As shown in FIGS. 1 and 3, the inside/outside air inlet switching means is provided to introduce either or both of air inside the passenger compartment (inside air) and air outside the passenger compartment (outside air), and has an inside/outside air inlet switching chamber 3 forming an uppermost air stream part in the air-conditioning case 2, a first inside/outside air inlet switching door 4, and a second inside/outside air inlet switching door 5. The first and second inside/outside air inlet switching doors 4 and 5 are pivotally mounted in the inside/outside air inlet switching chamber 3.

On one side of the inside/outside air inlet switching chamber 3, a first inside air inlet 6 is formed. On the other side of the inside/outside air inlet switching chamber 3, a second inside air inlet 7 for introducing inside air into the air-conditioning case 2 and an outside air inlet 8 for introducing outside air into the air-conditioning case 2 are formed.

The first inside/outside air inlet switching door 4 is a plate type for opening/closing the first inside air inlet 6. The second inside/outside air inlet switching door 5 is also a plate type for opening/closing the second inside air inlet 7 and the outside air inlet 8. The first and second inside/outside air inlet switching doors 4 and 5 are connected with servo motors 4a and 5a serving as actuators for them (see FIG. 6) via link mechanisms (not shown). These doors 4 and 5 are turned by the servo motors 4a and 5a, respectively.

In the inside/outside air inlet switching chamber 3, an air filter 9 is contained for purifying air by capturing such foreign matters as dust and dirt in air. A communicating path 10 is formed for air communication between the second inside air inlet 7 or the outside air inlet 8 and the first inside air inlet 6. As shown in FIG. 1, the first inside/outside air inlet switching door 4 fully closes the communicating path 10 when the first inside air inlet 6 is fully opened. In contrast, as shown in FIG. 3, the first inside/outside air inlet switching door 4 fully opens the communicating path 10 when the first inside air inlet 6 is fully closed.

A centrifugal blower 100 is disposed at an approximately center position in the inside/outside air inlet switching chamber 3. The centrifugal blower 100 has a first centrifugal fan 11, a second centrifugal fan 12, and a blower motor 13, which is energized by a blower drive circuit 13a for driving the first and second centrifugal fans 11 and 12. The first and second centrifugal fans 11 and 12 are integrally formed, and the diameter of the second centrifugal fan 12 is smaller than that of the first centrifugal fan 11.

These centrifugal fans 11 and 12 are housed in first and second scroll casing parts 16 and 17, respectively, which have first and second air inlets 14 and 15 formed in a bell mouth shape on each air drawing side. The end parts (air outlets) of the first and second scroll casing parts 16 and 17 are in communication with first and second air passages 18 and 19, respectively. The first and second scroll casing parts 16 and 17 have a partition plate 27 in common.

In the air-conditioning case 2 containing the air outlet switching means, there is provided an evaporator 20 which is a component part of a refrigerating cycle system mounted on the automobile. The refrigerating cycle system comprises a compressor (not shown) for compressing and discharging refrigerant using drive power of the engine of the automobile, a condenser (not shown) for condensing compressed refrigerant for liquefaction, a receiver (not shown) for separating condensed-liquefied refrigerant into vapor and liquid phases and delivering only liquid refrigerant to the downstream side, an expansion valve (not shown) for performing pressure-reducing expansion of liquid refrigerant, and said evaporator 20 for evaporating low-pressure refrigerant after pressure reduction.

The evaporator 20 is a component part corresponding to a cooling-cycle heat exchanger in the present invention, and it is disposed through the partition plate 27 (detailed later) so as to entirely block up the inside of the air-conditioning case 2. In the evaporator 20, an air cooling action is performed for cooling down air passing therethrough, and an air dehumidifying action is performed for dehumidifying air passing therethrough. More specifically, the evaporator 20 comprises a first cooling part for cooling down air flowing through the first air passage 18 and a second cooling part for cooling down air flowing through the second air passage 19 (detailed later).

The compressor (not shown) is equipped with an electromagnetic clutch (not shown) for transmitting/disconnecting drive power from the engine to the compressor. When the electromagnetic clutch is energized, drive power of the engine is transmitted to the compressor so that the evaporator 20 performs air cooling. When the electromagnetic clutch is de-energized, drive power of the engine is disconnected from the compressor so that the evaporator 20 stops air cooling.

Figure 2:
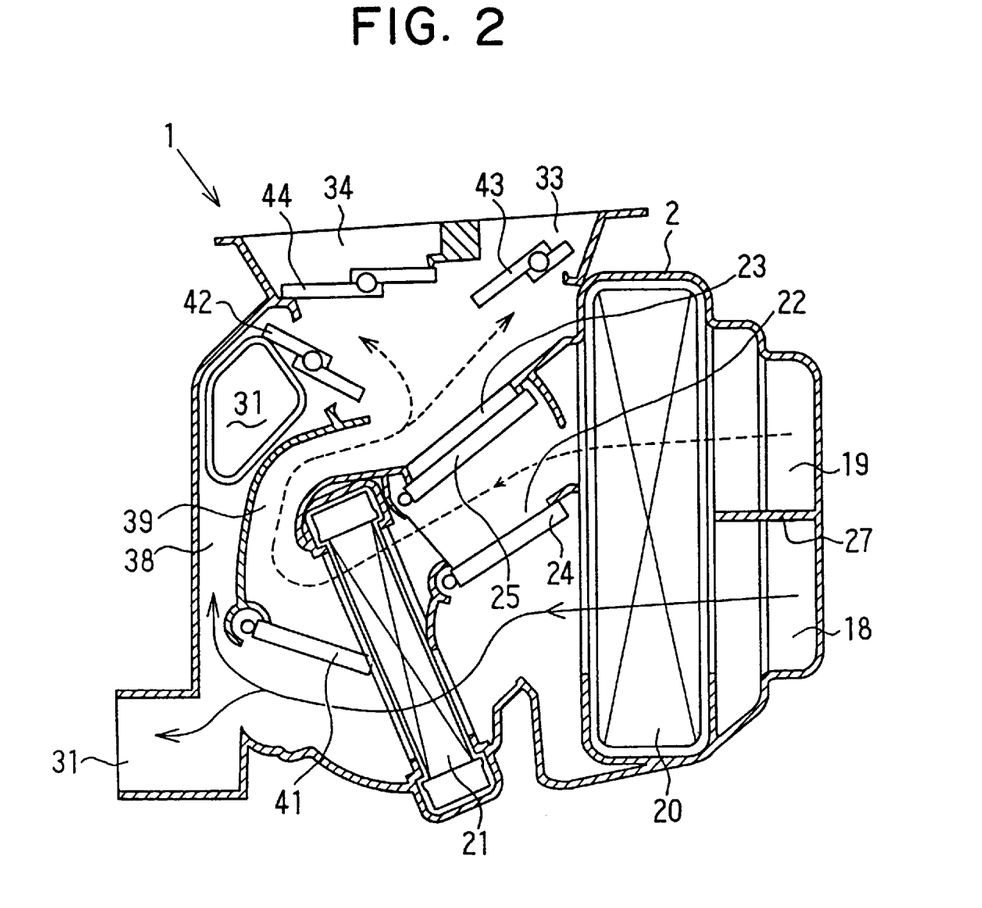
FIG. 2 is a cross sectional view showing a part of the air-conditioning unit under the inside-outside two-air-layer mode(mixture mode) according to the first embodiment of the present invention.
Figure 4:
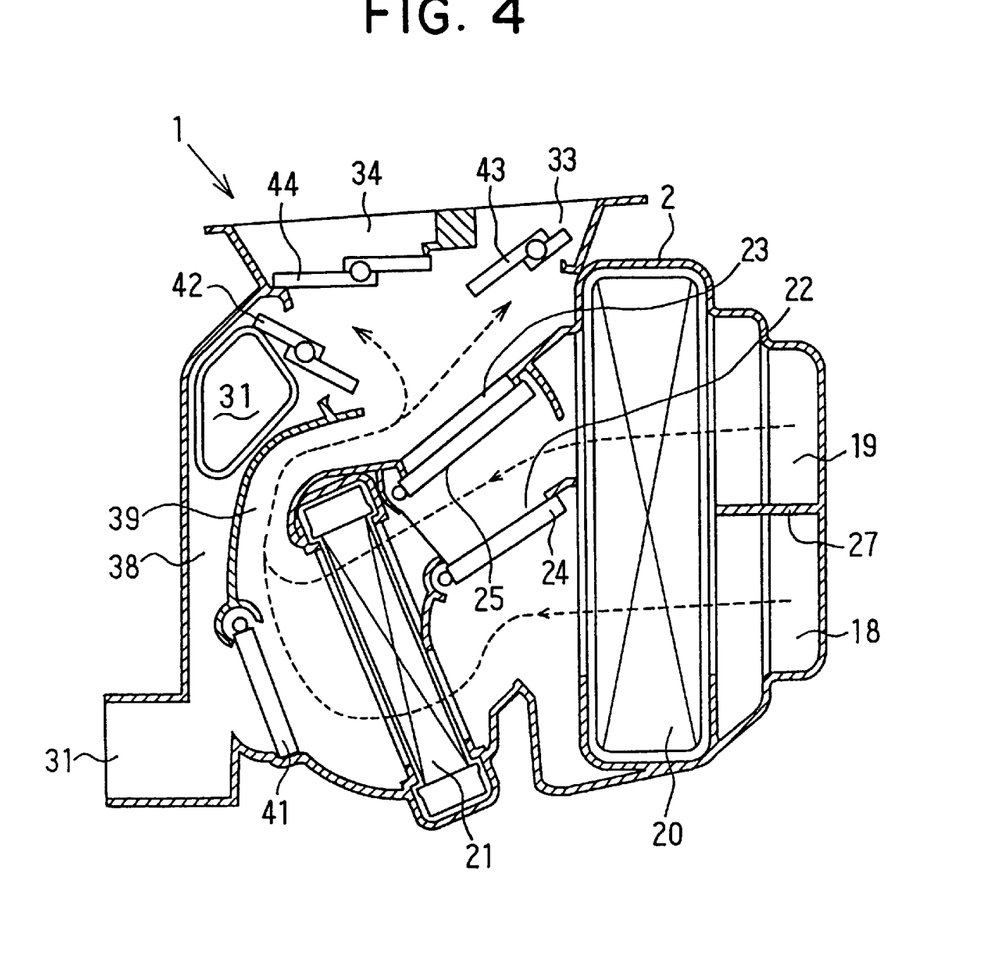
FIG. 4 is a cross sectional view showing a part of the air-conditioning unit under the outside air intake mode according to the first embodiment of the present invention.

On the air downstream side of the evaporator 20, there is provided a heater core 21 for reheating cold air fed from the evaporator 20. As shown in FIGS. 2 and 4, the heater core 21 is arranged so that cold air goes through first and second bypass passages 22 and 23 while circumventing the heater core 21. Supplied with heated cooling water from the engine, the heater core 21 functions as a heating-cycle heat exchanger for reheating cold air using the heated cooling water as a heat source for heating operation.

In the air-conditioning case 2, the heater core 21 is disposed through the partition plate 27 so as to partially block up the cross or height direction in the air-conditioning case 2. It comprises a first heating part for heating air flowing through the first air passage 18 and a second heating part for heating air flowing through the second air passage 19 (It will be described in detail later). On the air upstream side of the heater core 21, first and second air mix control doors 24 and 25 of a plate type (hereinafter referred to as A/M doors) are equipped integrally.

The first and second A/M doors 24 and 25 are connected with a servo motor 26 serving as an actuator for them (refer to FIG. 6) via a link mechanism (not shown). These doors 24 and 25 are driven to turn by the servo motor 26. Thus, the first and second A/M doors 24 and 25 regulate a ratio between air flow passing through the heater core 21 and air flow passing through the first and second bypass passages 22 and 23 according to their stop positions. That is, the first and second A/M doors 24 and 25 function as first and second blowout temperature control means for controlling a blowout temperature of air to be delivered into the passenger compartment.

As shown in FIGS. 2 and 4, in the air outlet switching means, the partition plate 27 is provided to define the first air passage 18 mainly used for inside air flow and the second air passage 19 mainly used for outside air flow. The evaporator 20 and the heater core 21 are disposed across the first and second air passages 18 and 19.

The first air passage 18 is an inside air passage(inside air layer) to blowout the inside air, introduced through the first inside air inlet 6, to the passenger compartment through a front foot (FrFOOT) opening 31 and a rear foot (RrFOOT) opening 32, and a front foot air outlet and a rear foot air outlet (both not shown)

Figure 5:
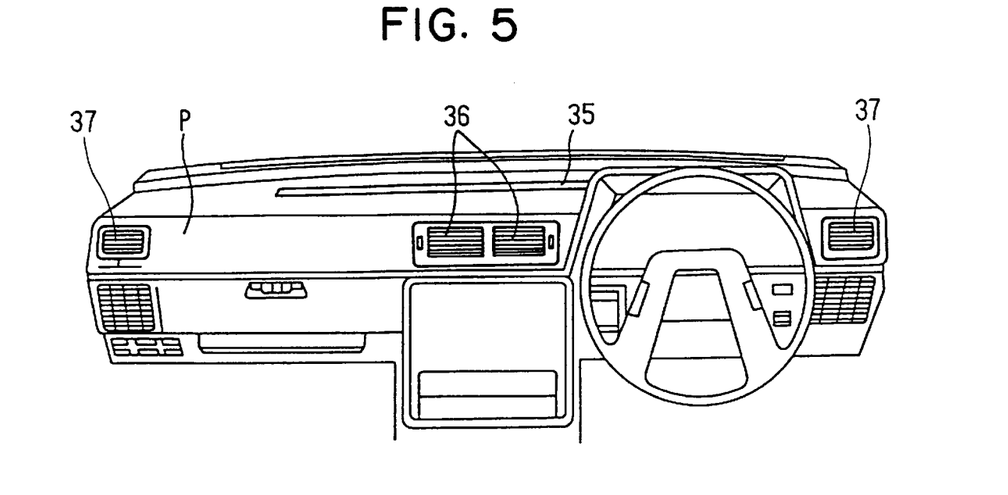
FIG. 5 is a front view showing an instrument panel of a vehicle according to the first embodiment of the present invention.

The second air passage 19 is an outside air passage (outside air layer) to blowout the outside air, introduced through the outside air inlet 8, to the passenger compartment through a defroster (DEF) opening 33 and a face (FACE) opening 34, a defroster air outlet 35, a center face air outlet 36, and a side face air outlet 37 (refer to FIG. 5).

The partition plate 27 is used as an air passage partitioning member in the present invention. On the lowermost air stream part in the air-conditioning case 2, communicating paths 38 and 39 are formed for air communication between the first air passage 18 and the second air passage 19. The communicating paths 38 and 39 are opened/closed by first and second foot doors which will be described later.

The FrFOOT opening 31 is connected to a front foot duct (not shown), and through the front foot air outlet located at the lowermost air stream end of the front foot duct, warm air is mainly delivered toward the feet of each passenger on a front seat in the passenger compartment. The RrFOOT opening 32 is connected with a rear foot duct (not shown), and through the rear foot air outlet located at the lowermost air stream end of the rear foot duct, warm air is mainly delivered toward the feet of each passenger on a rear seat in the passenger compartment. Still more, the DEF opening 33 is connected with a defroster duct (not shown), and through the defroster air outlet 35 located at the lowermost air stream end of the defroster duct, warm air is mainly delivered toward the internal surface of a front windshield of the automobile.

The FACE opening 34 is connected with a center face duct and a side face duct (both not shown). Through the center face air outlet 36 located at the lowermost air stream end of the center face duct, conditioned air introduced into the center face duct is delivered toward the head and breast (upper part) of each passenger on the front seat. Moreover, through the side face air outlet 37 located at the lowermost air stream end of the side face duct, conditioned air introduced into the side face duct is delivered toward the head and breast (upper part) of each passenger on the front seat or the internal surface of a side windshield of the automobile.

On the air upstream side of the openings 31 to 34 and the communicating paths 38 and 39, there are provided a first foot (FOOT) door 41, a second foot (FOOT) door 42, a defroster (DEF) door 43, and a face (FACE) door 44. The first and second FOOT doors 41 and 42 function as air outlet switching doors for opening/closing air flow passage to the front foot duct and rear foot duct. The DEF door 43 functions as an air outlet switching door for opening/closing air flow passage to the defroster duct. The FACE door 44 functions as an air outlet switching door for opening/closing air flow passage to the center face duct.

The air outlet switching doors 41 to 44 are connected with a servo motor 45 functioning as an actuator (see FIG. 6) via a link mechanism (not shown). These doors 41 to 44 are driven by the servo motor 45. More specifically, the servo motor 45 operates the link mechanism so that each of the air outlet switching doors 41 to 44 is turned to set up each air outlet mode. Air flow passage to the side face duct is not opened/closed by the air outlet switching doors 41 to 44. In the vicinity of the side face air outlet, there is provided an air outlet grill (not shown) which allows each passenger to manually open/close the side face air outlet. The air flow passage to the side duct is opened/closed by using said air outlet grill.

Figure 6:
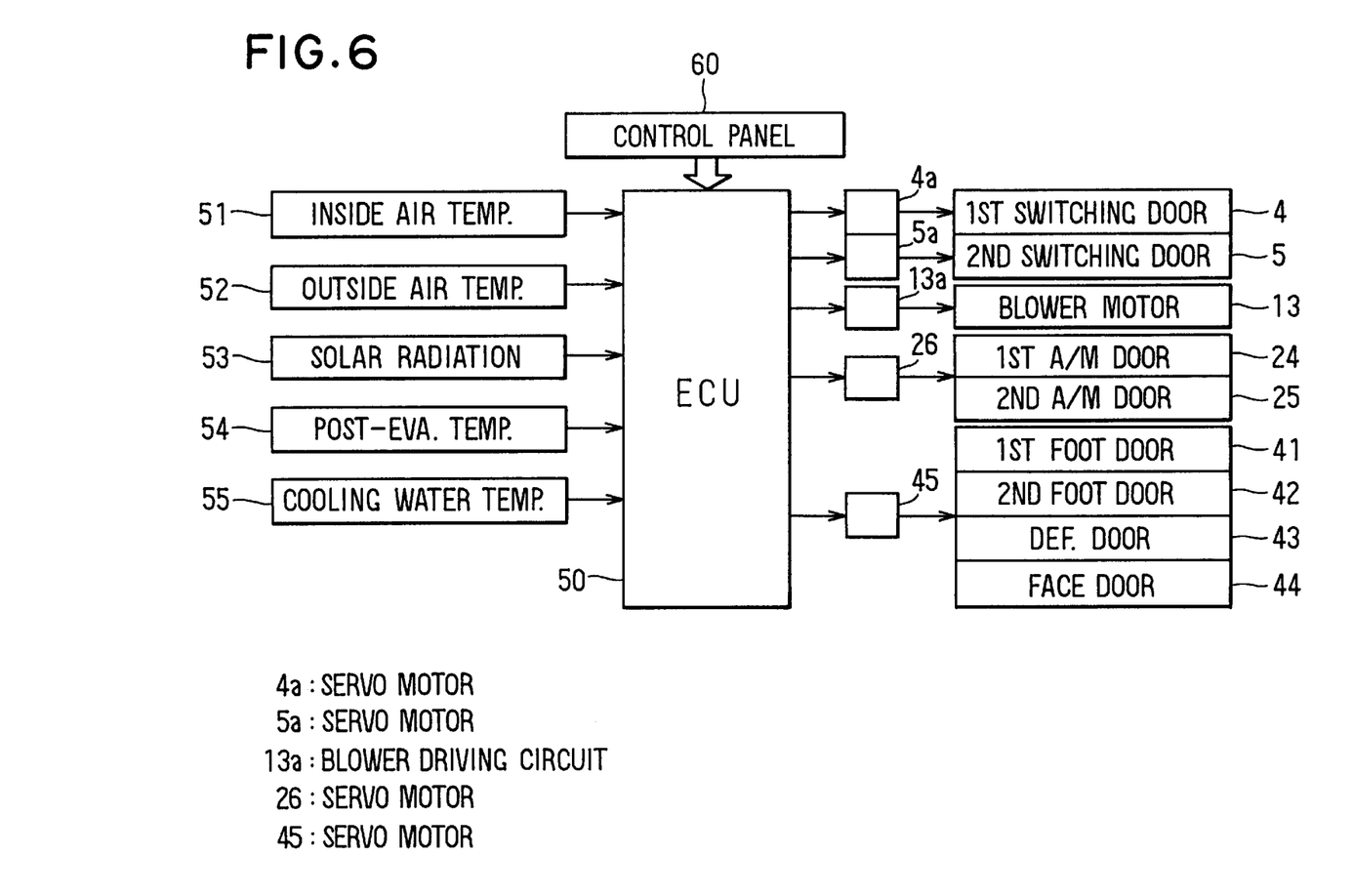
FIG. 6 is a block diagram showing a control system of an automotive air conditioner according to the first embodiment of the present invention.

Then, the following describes a control system of the automotive air conditioner in the present preferred embodiment with particular reference to FIG. 6.

The air conditioner ECU 50 for controlling each air-conditioning means in the air-conditioning unit 1 is supplied with each sensor signal from an inside air temperature sensor 51 for detecting a temperature of air inside the passenger compartment (inside air temperature) and an outside air temperature sensor 52 for detecting a temperature of air outside the passenger compartment (outside air temperature).

Furthermore, the air conditioner ECU 50 receives each sensor signal from a solar radiation sensor 53 for detecting an intensity level of solar radiation incident on the inside of the passenger compartment, a post-evaporator temperature sensor for detecting a degree of air cooling by the evaporator 20, and a cooling water temperature sensor 55 for detecting a temperature of cooling water fed to the heater core 21. The post-evaporator sensor 54 is a post-evaporator temperature detecting means comprising a thermistor or the like, which detects a temperature of air flow in the first air passage 18 immediately after passing through the evaporator 20.

In the inside of the air conditioner ECU 50, there is provided a known microcomputer comprising such semiconductor devices as CPU, ROM and RAM (not shown). Each sensor signal from said sensors 51 to 55 is converted into a digital form by an input circuit (not shown) in the air conditioner ECU 50, and then each digital signal is input to the microcomputer. The air conditioner ECU 50 is arranged so that power is supplied thereto from a battery (not shown) when an ignition switch (not shown) of the automobile engine is turned on.

Figure 7:
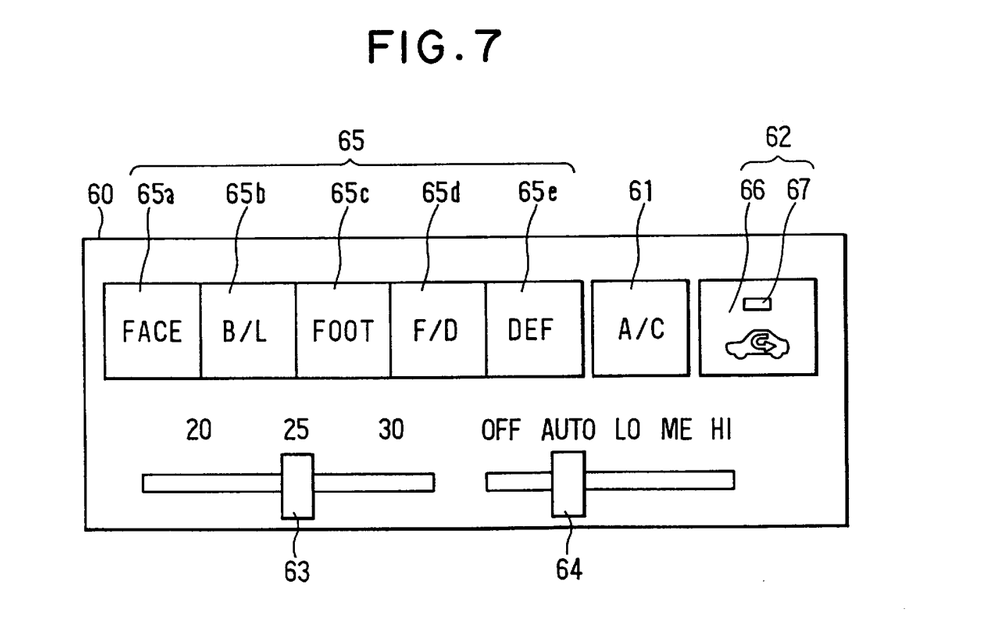
FIG. 7 is a plan view of a control panel of the automotive air conditioner according to the first embodiment of the present invention.

Furthermore, the air conditioner ECU 50 receives each switch signal from switches equipped on a control panel 60 (air-conditioning control panel in the present invention) which is mounted on an approximately center part of an instrument panel P in the passenger compartment. As shown in FIG. 7, the control panel 60 is equipped with an air conditioner (A/C) switch 61 for starting/stopping compressor operation, an inside/outside air inlet changeover switch 62 for switching the air inlet mode, a temperature setting lever 63 for setting up a desired air temperature in the passenger compartment, an air flow rate changeover lever 64 for changing an air flow rate of the first and second centrifugal fans 11 and 12, an air outlet changeover switch 65 for switching the air outlet mode, etc.

The inside/outside changeover switch 62 has an inside air recirculation pushbutton switch 66 and a light-emitting diode (LED) indicator 67 functioning as a visual indicator means. When the inside air recirculation button 66 is pressed (ON), the LED indicator 67 is turned on. In this state, the air conditioner ECU 50 is instructed to select a manual operation mode as the control mode, and to select an inside air recirculation mode as the air inlet mode. Furthermore, when the inside air recirculation button 66 is reset (OFF), the LED indicator 67 is turned off. In this state, the air conditioner ECU 50 is instructed to select an automatic control mode as the control mode, and to select an outside air intake mode or an inside-outside two-air-layer mode(mixture mode) as the air inlet mode.

When the air flow rate changeover lever 64 is set at OFF position, power to the blower motor 13 is turned off. When it is set at AUTO position, a blower voltage to the flower motor 13 is controlled automatically. When it is set at LO, ME or HI position, a blower voltage to the blower motor 13 is adjusted to a minimum value level (minimum flow rate), medium value level (medium flow rate) or maximum value level (maximum flow rate), respectively.

The air outlet changeover switch 65 comprises a face (FACE) button 65a for setting up a face mode, a bi-level (B/L) button 65b for setting up a bi-level mode, a foot (FOOT) button 65c for setting up a foot mode, a foot-defroster (F/D) button 65d for setting up a foot-defroster mode, and a defroster (DEF) button 65e for setting up a defroster mode.

Figure 8:
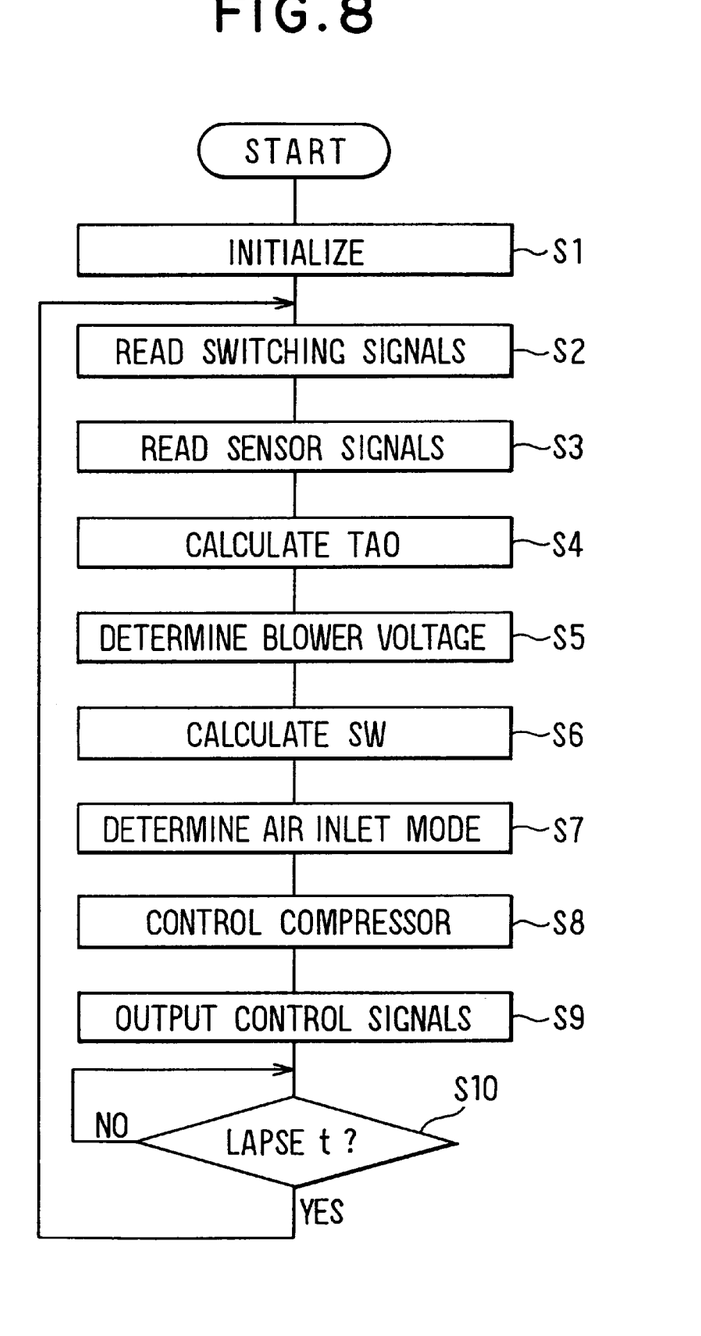
FIG. 8 is a flowchart showing basic control processes of an ECU of the automotive air conditioner according to the first embodiment of the present invention.
Figure 9:
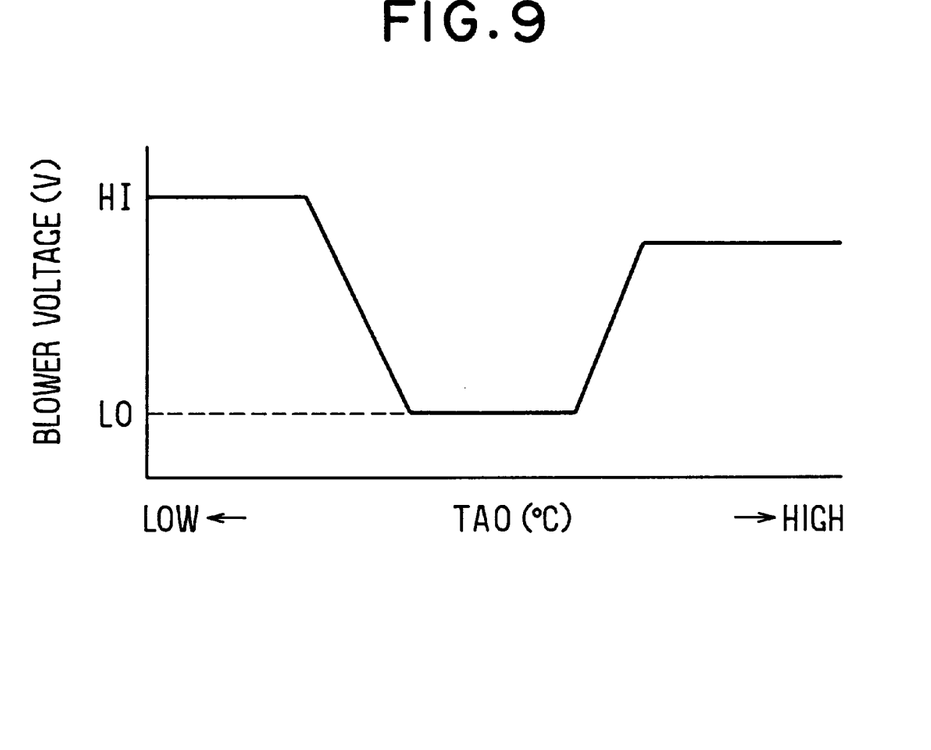
FIG. 9 is a characteristic graph showing a relationship between TAO and blower voltage according to the first embodiment of the present invention.

Then, the following describes a control method by the air conditioner ECU 50 in the first embodiment with particular reference to FIGS. 8 to 12. FIG. 8 shows a flowchart of basic control processing steps carried out by the air conditioner ECU 50.

When the ignition switch is turned on, power is supplied to the air conditioning ECU 50 to start a routine shown in FIG. 8, thus carrying out initialization and initial setting (step S1).

Then, each switch signal is read in from such switches as the inside/outside changeover switch 62, temperature setting lever 63, etc. (step S2).

Subsequently, each sensor signal is read in through analog-digital conversion from such sensors as the inside air temperature sensor 51, outside air temperature sensor 52, solar radiation sensor 53, post-evaporator temperature sensor 54, and cooling water temperature sensor 55 (step S3). Then, according the following Equation 1 which is pre-stored in the ROM, calculation is performed to determine a target blowout temperature (TAO) of air to be delivered into the passenger compartment (step S4).

$$TAO = KSET \times TSET - KR \times TR - KAM \times TAM - KS \times TS + C \quad \text{(Equation 1)}$$

where TSET indicates a set temperature specified by the temperature setting lever 63, TR indicates an inside air temperature detected by the inside air temperature sensor 51, TAM indicates an outside air temperature detected by the outside air temperature sensor 52, and TS indicates a solar radiation amount detected by the solar radiation sensor 53. KSET, KR, KAM and KS are gain values, and C is a constant for correction.

Then, according to characteristic map data (shown in FIG. 9) which is pre-stored in the ROM, calculation is performed to determine a blower voltage corresponding to TAO (a voltage to be applied to the blower motor 13) (step S5).

Then, according to the following Equation 2 which is pre-stored in the ROM, calculation is performed to determine a degree of opening of the first and second A/M doors 24 and 25 (A/M opening: SW) (step S6).

$$SW = \{(TAO-TE)/(TW-TE)\} \times 100 (\%) \quad \text{(Equation 2)}$$

where TE indicates a post-evaporator temperature detected by the post-evaporator temperature sensor 54, and TW indicates a cooling water temperature detected by the cooling water temperature sensor 55.

If $SW \leq 0$ (%) in the result of calculation, each of the first and second A/M doors 24 and 25 is controlled to a position where all the cold air from the evaporator 20 is fed through each of the first and second bypass passages 22 and 23 (MAX. COOL position). If $SW \geq 100$ (%) in the result of calculation, each of the first and second A/M doors 24 and 25 is controlled to a position where all the cold air from the evaporator 20 is fed through the heater core 21 (MAX. HOT position). If 0 (%)<SW<100 (%) in the result of calculation, each of the first and second A/M doors 24 and 25 is controlled to a position where cold air from the evaporator 20 is fed through the heater core 21 and through the first and second bypass passages 22 and 23.

Figure 11:
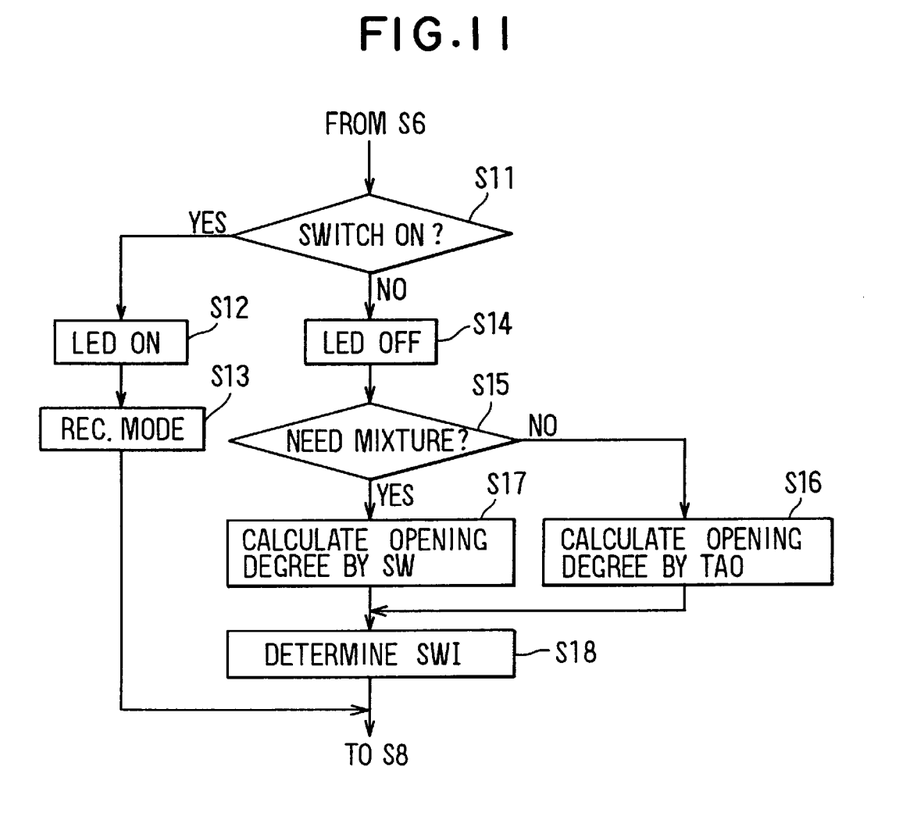
FIG. 11 is a flowchart showing control processes for determining an air inlet mode (Step 7) according to the first embodiment of the present invention.

Thereafter, control processing for air inlet mode selection is carried out. More specifically, a subroutine shown in FIG. 11 is called to determine a degree of opening of the first and second inside/outside air inlet switching doors 4 and 5 (step S7).

At this step of sequence, air outlet mode selection is made according to the setting of any air outlet changeover switch 65 on the control panel 60, including the FACE button 65a, B/L button 65b, FOOT button 65c, F/D button 65d, and DEF button 65e.

Figure 10:
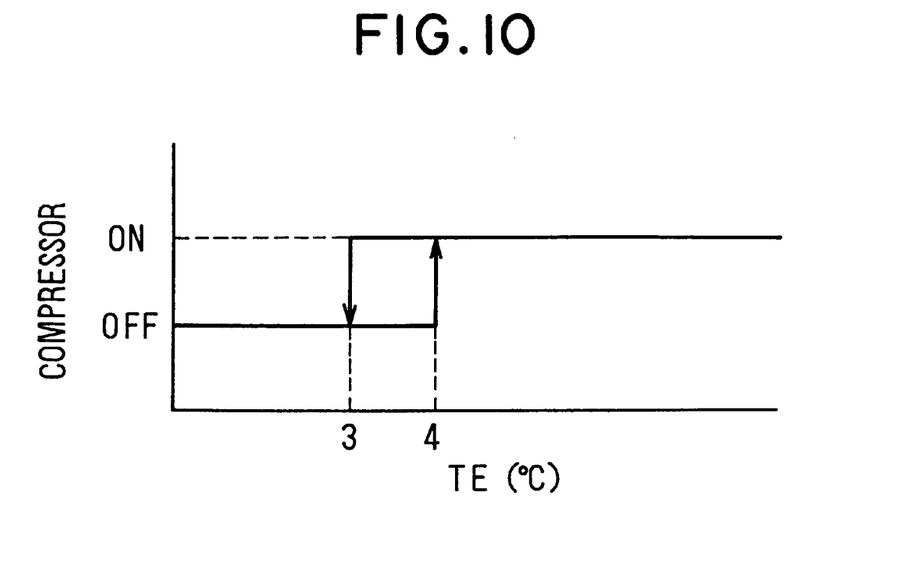
FIG. 10 is a characteristic graph showing a relationship between TE and a compressor according to the first embodiment of the present invention.

Then, when the A/C switch 61 is on, an operational status of the compressor is determined. According to characteristic data (shown in FIG. 10) which is pre-stored in the ROM, calculation is performed to determine a compressor mode corresponding to a post-evaporator temperature (TE) detected by the post-evaporator temperature sensor 54 (step S8). To be more specific, as shown in FIG. 10 indicating the characteristic data pre-stored in the ROM, if the post-evaporator temperature (TE) is not lower than a first frosting temperature level (e.g., 4° C.), the electromagnetic clutch is energized to turn on the compressor. If the post-evaporator temperature (TE) is not higher than a second frosting temperature (e.g., 3° C.), the electromagnetic clutch is de-energized to turn off the compressor.

Then, to attain each control status determined through calculation at each of steps S5 to S8, control signals are output to the blower drive circuit 13a and the servo motors 26 and 45. Further, control signals are output to the servo motors 4a and 5a for driving the first and second inside/outside air inlet switching doors 4 and 5 (step S9). Then, at step S10, after a lapse of a control cycle time 't' (e.g., 0.5 to 10 seconds), control processing is returned to step S2.

With particular reference to FIG. 11, the manner of control processing for air inlet mode selection (step S7) is described below in further detail.

First, it is determined whether the inside/outside air changeover switch 62 is turned on or not. More specifically, a determination is formed to check whether or not the inside air recirculation button 66 is pressed (turned on) (step S11). If the result of determination is 'YES', the manual operation mode is selected for control of air-conditioning operation and the LED indicator 67 lights up (step S12).

Then, the inside air recirculation mode is selected for air inlet operation. More specifically, a degree of opening of each of the first and second inside/outside air inlet switching doors 4 and 5 is determined to be 0% (step S13). Thereafter, control exits from the subroutine shown in FIG. 11.

If the result of determination is 'NO' at step S11, the automatic control mode is selected for control of air-conditioning operation and the LED indicator 67 is turned off (step S14).

Then, it is determined whether the inside-outside two-air-layer mode(mixture mode) is necessary for air-conditioning (step S15). More specifically, if the FOOT mode or F/D mode is selected for air outlet operation and also a degree of A/M opening (SW) of each of the first and second A/M doors 24 and 25 is more than 90%, it is determined that the inside-outside two-air-layer mode is necessary for air-conditioning (YES). If not, it is determined that the inside-outside two-air-layer mode is not necessary for air-conditioning (NO).

If the result of determination is 'NO' at step S15, a degree of opening for inside/outside air is calculated using a value of target blowout temperature (TAO). More specifically, according to characteristic data (shown in FIG. 13) which is pre-stored in the ROM, calculation is performed to determine an air inlet mode corresponding to a value of TAO determined at step S4 in FIG. 8. Then, a calculated degree of opening of each of the first and second inside/outside air inlet switching doors 4 and 5 (calculated value of inside/outside air opening: SWIT) is stored into memory (step S16).

Figure 13:
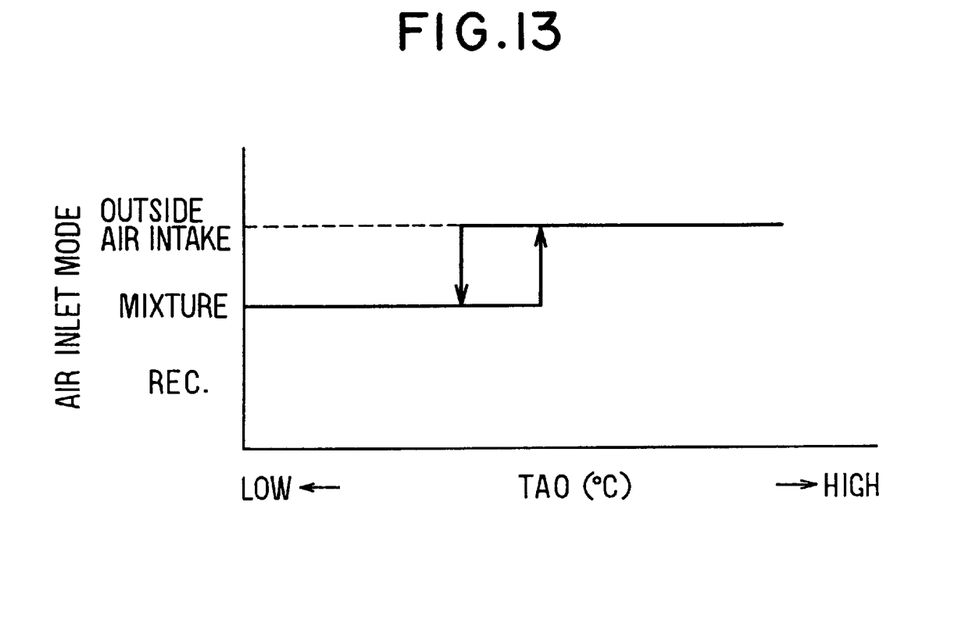
FIG. 13 is a characteristic graph showing a relationship between TAO and the air inlet mode according to the first embodiment of the present invention.

As shown in the characteristic data in FIG. 13, if a level of target blowout temperature (TAO) is not lower than a first specified temperature level, the outside air intake mode is selected for air inlet operation. To be more specific, a degree of opening of each of the first and second inside/outside air inlet switching doors 4 and 5 is determined to be 100%. If a level of target blowout temperature (TAO) is lower than a second specified temperature level, the inside-outside two-air-layer mode is selected for air inlet operation. To be more specific, a degree of opening of the first inside/outside air inlet switching door 4 is determined to be 0%, and a degree of opening of the second inside/outside air inlet switching door 5 is determined to be 100%.

If the result of determination is 'YES' at step S15, a degree of opening for inside/outside air is calculated according to A/M opening (SW). More specifically, according to characteristic data (shown in FIG. 12) which is pre-stored in the ROM, calculation is performed to determine an air inlet mode corresponding to a value of A/M opening (SW) of each of the first and second A/M doors 24 and 25 which has been determined at step S6 in FIG. 11. Then, a calculated value of opening of each of the first and second inside/outside air inlet switching doors 4 and 5 (calculated value of inside/outside air opening: SWIS) is stored into memory (step S17).

Figure 12:
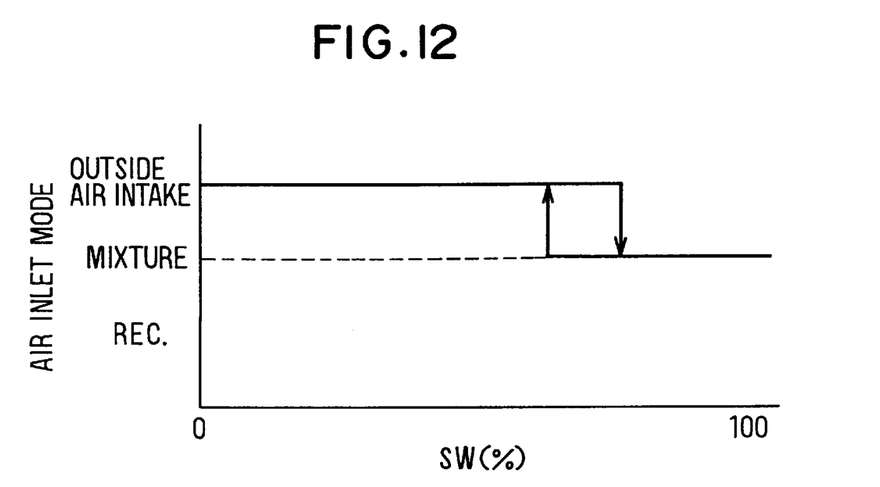
FIG. 12 is a characteristic graph showing a relationship between SW and the air inlet mode according to the first embodiment of the present invention.

As shown in the characteristic data in FIG. 12, if a value of A/M opening (SW) is not smaller than a first specified opening level (%), the inside-outside two-air-layer mode is selected for air inlet operation. To be more specific, a degree of opening of the first inside/outside air inlet switching door 4 is determined to be 0%, and a degree of opening of the second inside/outside air inlet switching door 5 is to be 100%. If a value of A/M opening (SW) is not more than a second specified opening level (%), the outside air intake mode is selected for air inlet operation. To be more specific, a degree of opening of each of the first and second inside/outside air inlet switching doors 4 and 5 is determined to be 100%.

Then, comparison is made between the calculated value of inside/outside air opening (SWIT) determined at step S16 and the calculated value of inside/outside air opening (SWIS) determined at step S17, and a smaller value between them (minimum value) is taken as a target value of inside/outside air opening SWI for each of the first and second A/M doors 24 and 25 (step S18). Thereafter, control exits from the subroutine shown in FIG. 11 and goes to step S8.

The following describes operation of each air-conditioning element in the air-conditioning unit 1 with reference to FIGS. 1 to 13.

1) Inside-outside two-air-layer mode(Mixture Mode) under the automatic control mode:

If the air inlet mode is switched to the inside-outside two-air-layer mode due to a relatively low level of target blowout temperature (TAO), the first inside/outside air inlet switching door 4 is set to a position of 0% opening as indicated by a solid line in FIG. 1 and the second inside/outside air inlet switching door 5 is set to a position of 100% opening as indicated by a solid line therein. In this case, since the inside air recirculation button 66 of the inside/outside air changeover switch 62 is turned off (normal), the LED indicator 67 remains off.

Therefore, as the first centrifugal fan 11 rotates, inside air is introduced into the inside/outside changeover chamber 3 through the first inside air inlet 6, and then it is fed to the first air passage 18 through the first air inlet 14 and the first scroll casing part 16 as indicated by an arrow-pointed solid line in FIG. 1. Thereafter, as indicated by an arrow-pointed solid line in FIG. 2, inside air drawn into the first air passage 18 passes through the first cooling part of the evaporator 20 so that it is cooled, and then inside air thus cooled runs into the communicating path 38 through the first heating part of the heater core 21.

On the other hand, as the second centrifugal fan 12 rotates, outside air is introduced into the inside/outside air inlet switching chamber 3 through the outside air inlet 8, and then it is fed to the second air passage 19 through the second air inlet 15 and the second scroll casing part 17 as indicated by an arrow-pointed broken line in FIG. 1. Thereafter, as indicated by an arrow-pointed broken line, outside air drawn into the second air passage 19 passes through the second cooling part of the evaporator 20 so that it is cooled, and then outside air thus cooled runs into the communicating path 39 through the second heating part of the heater core 21.

In a situation where the inside-outside two-air-layer mode is selected for air inlet operation and the FOOT mode or F/D mode is selected for air outlet operation, the first FOOT door 41 fully opens the RrFOOT opening 32 and the communicating path 38, the second FOOT door 42 opens the FrFOOT opening 31 to some extent, the FED door 43 opens the DEF opening 33 to some extent, and the FACE door 44 fully closes the FACE opening 34, as shown in FIG. 2.

Thus, as indicated by arrow-pointed solid lines in FIG. 2, inside air fed through the first air passage 18 runs into the communicating path 38, passes through the FrFOOT and RrFOOT openings 31 and 32, and blows out toward the feet of each passenger on the front seat in the passenger compartment through the front foot air outlet and toward the feet of each passenger on the rear seat in the passenger compartment through the rear foot air outlet. On the other hand, as indicated by arrow-pointed broken lines in FIG. 2, a part of outside air fed through the second air passage 19 blows out toward the feet of each passenger on the front seat in the passenger compartment through the front foot air outlet together with inside air, and the remaining part of outside air blows out toward the internal surface of the front windshield through the defroster air outlet.

2) Outside air intake mode under automatic control mode:

If the air inlet mode is switched to the outside air intake mode due to a relatively high level of target blowout temperature (TAO), the first inside/outside air inlet switching door 4 is set to a position of 100% opening as indicated by a solid line in FIG. 3 and the second inside/outside air inlet switching door 5 is set to a position of 100% opening as indicated by a solid line therein. In this case, since the inside air recirculation button 66 of the inside/outside air changeover switch 62 is turned off (normal), the LED indicator 67 remains off.

Therefore, as the first centrifugal fan 11 rotates, outside air is introduced into the inside/outside air inlet switching chamber 3 through the outside air inlet 8, and then it is fed to the first air passage 18 through the communicating path 10, the first air inlet 14 and the first scroll casing part 16. On the other hand, as the second centrifugal fan 12 rotates, outside air is also introduced into the inside/outside air inlet switching chamber 3 through the outside air inlet 8, and then it is fed to the second air passage 19 through the second air inlet 15 and the second scroll casing part 17. Thereafter, outside air drawn into the first air passage 18 and outside air drawn into the second air passage 19 pass through the evaporator 20 so that they are cooled, and then they run through the heater core 21.

When the outside air intake mode is selected for air inlet operation and the FOOT mode or F/D mode is selected for air outlet operation, the first FOOT door 41 fully closes the RrFOOT opening 32 and the communicating path 38, the second FOOT door 42 opens the FrFOOT opening 31 to some extent, the DEF door 43 opens the DEF opening 33 to some extent, and the FACE door 44 fully closes the FACE opening 34, as shown in FIG. 4.

Thus, as indicated by arrow-pointed broken lines in FIG. 4, outside air passed through the first air passage 18 and outside air passed through the second air passage 19 are mixed on the air downstream side of the heater core 21 to provide conditioned air having an optimum temperature. Then, a majority of conditioned air blows out toward the feet of each passenger on the front seat in the passenger compartment through the front foot air outlet and toward the feet of each passenger on the rear seat in the passenger compartment through the rear foot air outlet. The remaining part of conditioned air blows out toward the internal surface of the front windshield through the defroster air outlet.

3) Inside air recirculation (forced) mode under the manual operation mode:

When the inside air recirculation button 66 of the inside/outside air changeover switch 62 is turned on (pressed) and the LED indicator 67 lights up, the inside air recirculation (forced) mode is set up fixedly for air inlet operation. In this case, a degree of opening of each of the first and second inside/outside air inlet switching doors 4 and 5 is set to 0%.

Therefore, as the first and second centrifugal fans 11 and 12 rotate, inside air is introduced through the first inside air inlet 6 and also inside air is introduced through the second inside air inlet into the inside/outside air inlet switching chamber 3, and then they are fed to the first and second air passages 18 and 19. Thereafter, inside air drawn into the first air passage 18 and inside air drawn into the second air passage 19 pass through the evaporator 20 so that they are cooled. Then, after running through the heater core 21 or the first and second bypass passages 23 and 24, they are mixed on the communication paths 38 and 39.

According to the first preferred embodiment of the present invention, as described above, when the inside air recirculation button 66 is turned on and the LED indicator 67 lights up, the manual operation mode is chosen for the air intake control mode, and the inside air recirculation mode is fixed forcedly for the air inlet operation. When the inside air recirculation button 66 is turned off and the LED indicator 67 goes off, the automatic control mode is chosen for the air intake control mode, and either the outside air intake mode or the inside-outside two-air-layer mode is selected for the air intake control mode according to TAO.

Therefore, even in an arrangement that the inside/outside air changeover switch 62 comprises the single inside air recirculation button 66 and single LED indicator 67, it is possible to make air intake mode selection under automatic control, and also perform changeover between the automatic control mode and the manual operation mode for the air intake control of air-conditioning operation. Thus, automatic control based on air-conditioning load can be carried out, and also the inside air recirculation mode selected manually by the passenger in the passenger compartment can be changed over to the automatic control mode through switch operation. In comparison with the conventional arrangement that two switches are equipped for selection between the manual operation mode and the automatic control mode, the present invention is advantageous in that the number of parts is reduced to simplify electrical wiring connections and make operation still easier.

In the manner mentioned above, the number of parts mounted on the control panel 60 can be reduced. Since the control panel 60 can be designed to have a compact size, it becomes possible to easily mount instruments, cassette deck, radio set, and other passenger compartment equipment at convenient positions near passengers in the passenger compartment. When the LED indicator 67 turns off (from 'on' state), each passenger in the passenger compartment recognizes a visual indication just like that for changeover from the inside air recirculation mode to the outside air intake mode. Further, in the automatic control mode, at least a part of outside air can be introduced into the passenger compartment, thereby not causing the passenger to be put into confusion.

In a situation where the inside-outside two-air-layer mode is selected for air inlet operation and the FOOT mode or F/D mode is selected for air outlet operation, pre-warmed high-temperature inside air is drawn into the first air passage 18 and heated by the heater core 21. Then, inside air thus heated is delivered into the passenger compartment through the front foot air outlet and the rear foot air outlet, thereby making it possible to improve heating performance. Further, low-humidity outside air is heated by the heater core 21 and then it is delivered toward the internal surface of front windshield through the defroster air outlet 35, thereby enhancing reliability in defrosting performance for the internal surface of the front windshield.

In the air-conditioning unit 1 according to the present preferred embodiment, air inlet mode selection can be made under automatic control. Therefore, on a diesel-engine-mounted automobile or hybrid automobile having a relatively small capacity of engine-exhaust heat, for example, it is possible to carry out air-conditioning with low-heat source in the inside-outside two-air-layer mode or with saved drive power in cooling-down operation.

[Second Embodiment]

Figure 14:
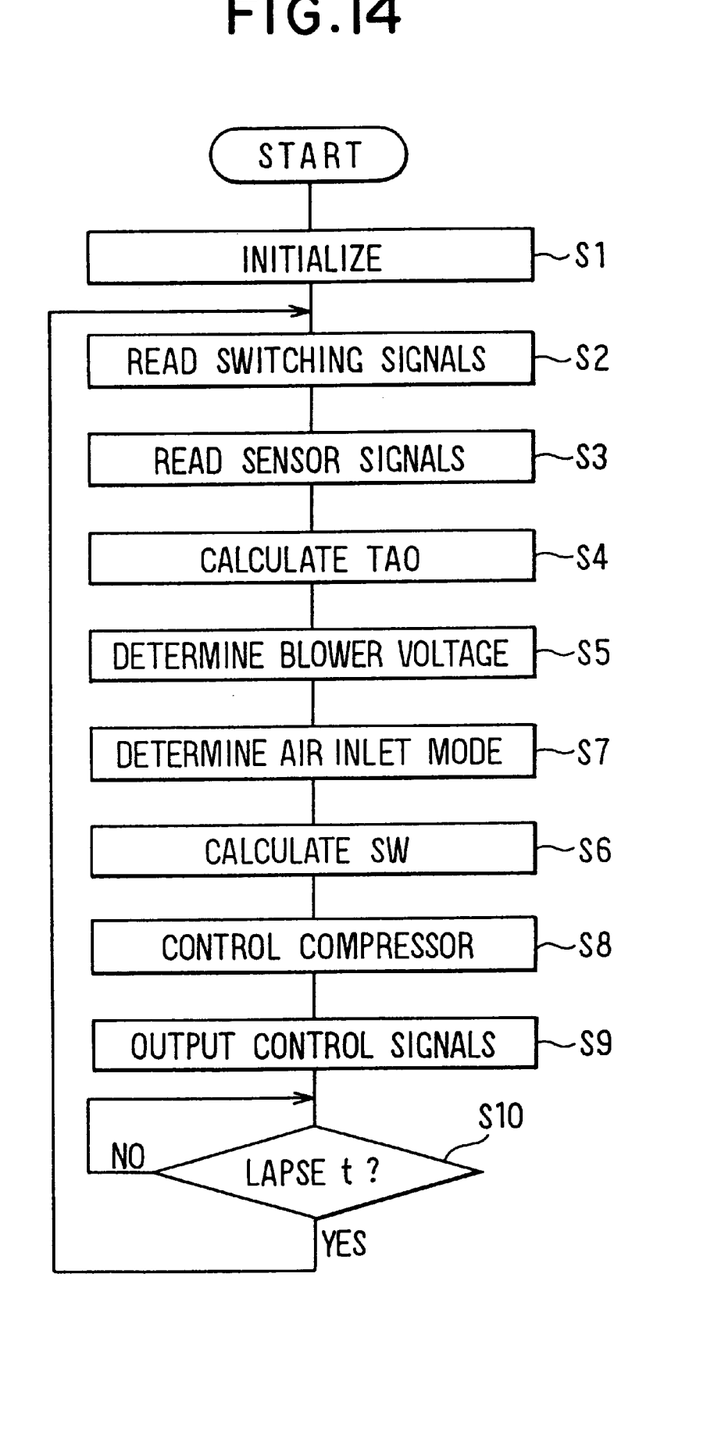
FIG. 14 is a flowchart showing basic control processes of the ECU of the automotive air conditioner according to a second embodiment of the present invention.
Figure 15:
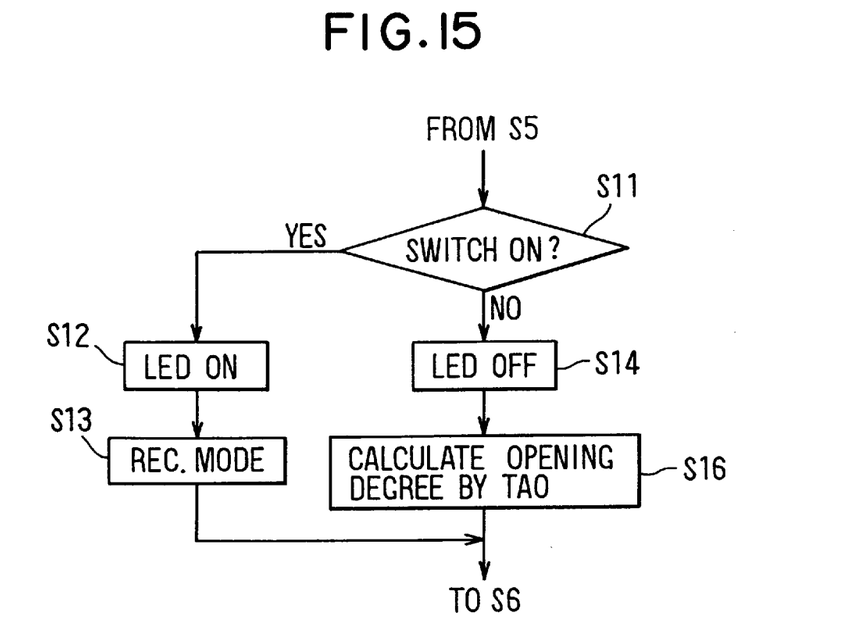
FIG. 15 is a flowchart showing control processes for determining an air inlet mode (Step 7) according to the second embodiment of the present invention.

Referring to FIGS. 14 and 15, there is shown a second embodiment of the present invention.

In the second embodiment, steps S6 and S7 indicated in the flowchart in FIG. 8 are replaced with each other (see the flowchart shown in FIG. 14).

In the flowchart of subroutine shown in FIG. 15, processing steps which are substantially the same as those in the flowchart shown in FIG. 11 are assigned the same reference numerals.

After completion of step S14 in control processing, according to characteristic data which is pre-stored in the ROM (see FIG. 13), calculation is performed to determine an air inlet mode corresponding to a value of target blowout temperature TAO (step S16). Then, control exits from the subroutine shown in FIG. 15.

[Other Preferred Embodiments]

In the first and second preferred embodiments mentioned above, the evaporator 20 of refrigerating cycle system is used as a cooling-cycle heat exchanger and the heater core 21 is used as a heating-cycle heat exchanger. Instead of this arrangement, there may also be provided such an arrangement that a cooling-cycle heat exchanger incorporating a Peltier-effect element or other air cooling device is used or a heating-cycle heat exchanger incorporating an electric heater or other air cooling device is used.

While the LED indicator 67 mounted on the inside air recirculation button 66 is employed as a means of 'on/off' visual indication in the first and second preferred embodiments, there may be provided such an LED indicator 67 as is mounted in the vicinity of the inside air recirculation button 66 (on the control panel 60) or such an visual indication means as an liquid crystal display for indicating a currently selected air inlet mode. Moreover, an audible indication means such as a buzzer or sound/voice generator may be used for indicating a currently selected air inlet mode.

In the first and second preferred embodiments, the first and second inside/outside switching doors (air inlet mode switching means) 4 and 5 are driven to turn by the servo motors 4a and 5a via the link mechanisms. In lieu of this arrangement, there may be provided such an arrangement that the air inlet mode switching means are driven by a single servo motor serving as an actuator in combination with link mechanisms. Moreover, such an air inlet mode switching means as a film door or shutter may be used in place of each of the first and second inside/outside air inlet switching doors 4 and 5. Still more, one inside air inlet and one outside air inlet may be provided so that they will be opened/closed by a single air inlet mode switching means.

Although the pushbutton switches having pressed and normal states are employed in the first and second preferred embodiments, non-lock-type switches, i.e., momentary switches may be used instead.

In the first and second preferred embodiments, there is provided one inside air recirculation button (pushbutton switch), which is used in a manner that pressing it once selects the manual operation mode for control of air-conditioning operation and pressing it again selects the automatic control mode for control of air-conditioning operation. In lieu of it, there may be provided one rotary switch of two-position type which is used in a manner that rotating it to one position selects the manual operation mode for control of air-conditioning operation and rotating it to the other position selects the automatic control mode for control of air-conditioning operation. As to a two-position-type rotary switch, it requires fewer electrical wiring connections than a three-position-type rotary switch.

The invention may be embodied in other specific forms without departing from the spirit or essential characteristics thereof. The present embodiments are therefore to be considered in all respects as illustrative and not restrictive, the scope of the invention being indicated by the appended claims rather by the foregoing description and all changes which come within the meaning and range of equivalency of the claims are therefore intended to be embraced therein.

What is claimed is:

1. An automotive air conditioner comprising:

an air conditioning casing having an inside air inlet to intake an air inside of an automobile, and having an outside air inlet to intake an air outside of the automobile;

air inlet mode switching means for selecting an air inlet mode from an inside air recirculation mode, an outside air intake mode, and a mixture mode, said inside air recirculation mode being for introducing said inside air from said inside air inlet to said casing, said outside air intake mode being for introducing said outside air from said outside air inlet to said casing, said mixture mode being for introducing both of said inside air and said outside air from said inside air inlet and said outside air inlet;

an indicator for indicating whether a control mode is a manual operation mode or an automatic control mode, and for indicating whether said air inlet mode is said inside air recirculation mode;

a switch for switching said control mode between said manual operation mode and said automatic control mode; and a control unit for controlling said air inlet mode in such a manner that said inside air recirculation mode is selected when said manual operation mode is selected by said switch, and that said air inlet mode is selected from said outside air intake mode and said mixture mode when said automatic control mode is selected by said switch.

2. An automotive air conditioner according to claim 1, wherein said switch includes a push button which selects said manual operation mode when said switch is pushed once, and selects said automatic control mode when said switch is pushed twice.

3. An automotive air conditioner according to claim 1, wherein said switch includes a rotary switch which selects said control mode between said manual operation mode and said automatic control mode.

4. An automotive air conditioner according to claim 1, wherein said indicator indicates visually.

5. An automotive air conditioner according to claim 1, wherein said indicator indicates acoustically.

6. An automotive air conditioner according to claim 1, wherein;

said automotive air conditioner further includes temperature setting means for setting a target temperature in said automobile and inside air temperature detecting means for detecting a temperature of said inside air;

said control unit includes target blowout temperature determining means for determining a target blowout temperature of an air blown out into said automobile from said casing based on said target temperature set by said temperature setting means and said inside air temperature detected by said inside air temperature detecting means; and said control unit includes air inlet mode determining means, for selecting said mixture mode when said target blowout temperature is lower than a predetermined temperature, and for selecting said outside air intake mode when said target blowout temperature is higher than said predetermined temperature, during said automatic control mode.

7. An automotive air conditioner according to claim 1, wherein;

said casing includes a first air passage for introducing said inside air from said inside air inlet and a second air passage for introducing said outside air from said outside air inlet;

said automotive air conditioner includes a first heat exchanger for cooling said inside air and said outside air in said first air passage and said second air passage; and said automotive air conditioner includes a second heat exchanger for heating said inside air and said outside air in said first air passage and said second air passage.

8. An automotive air conditioner according to claim 1, wherein;

said control unit includes mixture mode determining means for determining a necessity of said mixture mode when said automatic control mode is selected.

9. An automotive air conditioner comprising:

an air conditioning casing having an inside air inlet to intake an air inside of an automobile, and having an outside air inlet to intake an air outside of the automobile;

air inlet mode determining means for determining one of an inside air recirculation mode, an outside air intake mode, and a mixture mode, said inside air recirculation mode being for introducing said inside air from said inside air inlet to said casing, said outside air intake mode being for introducing said outside air from said outside air inlet to said casing, said mixture mode being for introducing both of said inside air and said outside air from said inside air inlet and said outside air inlet;

an indicator for indicating whether a control mode is a manual operation mode or an automatic control mode, and for indicating whether said air inlet mode is said inside air recirculation mode;

a switch for switching said control mode between said manual operation mode and said automatic control mode;

outside air prohibiting means for prohibiting said air inlet mode determining means from determining one of said outside air intake mode and said mixture mode when said manual operation mode is selected by said switch; and recirculation mode prohibiting means for prohibiting said air inlet mode determining means from determining said inside air recirculation mode when said automatic control mode is selected by said switch.

* * * * *